United States Patent

Hamburg

[11] 4,094,291
[45] June 13, 1978

[54] APPARATUS FOR MIXING A VAPORIZED LIQUID FUEL WITH AIR

[75] Inventor: Douglas R. Hamburg, Birmingham, Mich.

[73] Assignee: Ford Motor Company, Dearborn, Mich.

[21] Appl. No.: 660,310

[22] Filed: Feb. 23, 1976

[51] Int. Cl.² ............................................. F02M 29/00
[52] U.S. Cl. .................................. 123/141; 48/180 S
[58] Field of Search .......... 123/141; 48/180 R, 180 S; 261/79 R

[56] References Cited

U.S. PATENT DOCUMENTS

| 1,937,875 | 12/1933 | Denman et al. | 123/141 |
| 2,701,557 | 2/1955 | Ramey | 123/141 |
| 3,395,899 | 8/1968 | Kopa | 123/141 X |
| 3,544,290 | 12/1970 | Larson et al. | 123/141 X |
| 3,847,125 | 11/1974 | Malherbe | 123/141 X |

FOREIGN PATENT DOCUMENTS

| 897,902 | 4/1945 | France | 123/141 |
| 1,213,642 | 1/1960 | France | 123/141 |
| 2,219,982 | 11/1973 | Germany | 123/141 |
| 176,437 | 6/1935 | Switzerland | 123/141 |

Primary Examiner—Charles J. Myhre
Assistant Examiner—Ira S. Lazarus
Attorney, Agent, or Firm—Robert A. Benziger; Keith L. Zerschling

[57] ABSTRACT

A mixing apparatus for mixing a vaporized liquid fuel with air to develop a combustible air/fuel mixture is described. A finned swirl inducing member having a centrally located aperture is positioned downstream from a metering venturi and upstream from a plain tube mixing section. The centrally positioned aperture is sized and spaced to allow passage of a stream of vaporized liquid fuel delivered to the low pressure zone formed by a metering venturi. The fin members of the swirler are operative to cause a swirl of the air stream passing through the metering venturi. The swirling air stream prevents any direct contact between the vapor stream and the relatively cool side walls of the mixing section while causing mixing action between the interiorly constrained vaporized liquid fuel stream and the inner portions of the air swirl.

5 Claims, 3 Drawing Figures

U.S. Patent   June 13, 1978   4,094,291
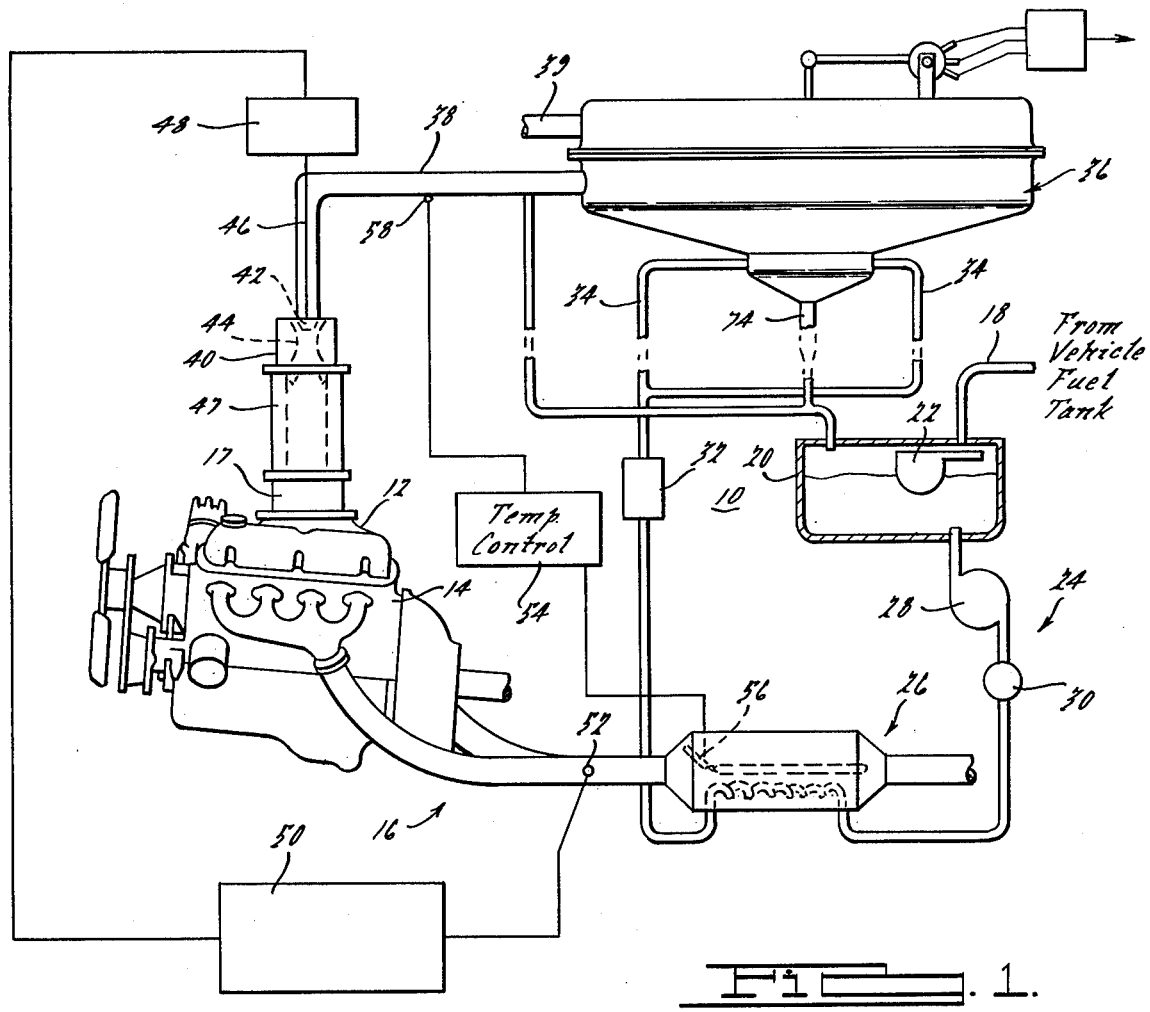
FIG. 1.
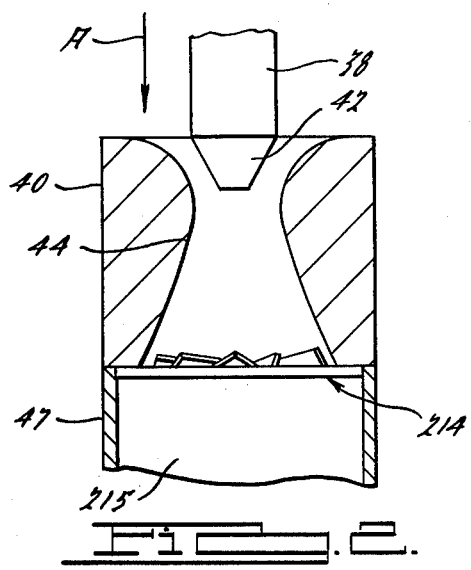
FIG. 2.
FIG. 3.

APPARATUS FOR MIXING A VAPORIZED LIQUID FUEL WITH AIR

CROSS REFERENCE TO RELATED APPLICATION

This application is related to copending commonly assigned patent application Ser. No. 660,281, filed on Feb. 23, 1976 in te names of J. E. Auiler et al., and titled "Vaporized Liquid Fuel Delivery and Metering System".

BACKGROUND OF THE INVENTION

The present invention is directed to the field of internal combustion engine fuel delivery and metering systems generally. In particular, the present invention is directed to that portion of the above-noted field which is concerned with the delivery and metering of a liquid fuel in an air stream to provide a combustible air/fuel mixture for an internal combustion engine. More particularly still, the present invention is directed to that portion of the above-noted field which is concerned with the delivery and metering of a fuel which is normally a liquid at standard temperature and pressure (S.T.P.) but which has been vaporized prior to mixture with the air stream. More particularly still, the present invention is directed to that portion of the above-noted field which is concerned with the intermixing of a vaporized liquid fuel with a stream of air in order to establish a combustible air/fuel mixture. More particularly still, the present invention is directed to that portion of the above-noted field which is concerned with the mixing of a vaporized liquid fuel with a stream of air while avoiding conditions which would promote condensation of the vaporized liquid fuel.

DESCRIPTION OF THE PRIOR ART

It is well known in the prior art to provide a fuel in liquid form to a moving air stream for delivery to the combustion chambers of an internal combustion engine. The prior art systems generally have utilized mechanical or electromechanical fuel delivery and metering apparatus to provide metered quantities of liquid fuel in proximity to, and in some cases into, the combustion chambers of internal combustion engines. The prior art has also taught that a quantity of liquid fuel may be added to a quantity of moving air upstream from, and for ultimate delivery to, a plurality of combustion chambers through a plurality of intake manifold conduits. The advent of federally mandated internal combustion engine exhaust emissions standards has resulted in the adoption of techniques to substantially reduce the quantity of pollutants produced by an internal combustion engine. One technique to reduce the quantity of atmospheric pollutants generated by an internal combustion engine has been the use of an exhaust gas catalyst.

Exhaust gas catalysts which operate upon the three principal pollutants, carbon monoxide (CO), hydrocarbons (HC), and the oxides of nitrogen ($NO_x$) are generally expensive devices. In addition, these devices require that the input gases be within a fairly tightly controlled and constrained range of chemical constituents. The economically most practical such devices require that the input gases have a gross chemical composition which very closely approximates stoichiometric conditions.

The advent of federally mandated internal combustion engine exhaust emissions standards has also prompted detailed analysis of the internal combustion as a converter of chemical energy to mechanical power (i.e., as a power source) and as a source of atmospheric pollutants. It has been determined that the conventional fuel metering and delivery systems which have been designed to utilize a liquid fuel petroleum product are generally not capable of providing the degree of control of the air/fuel ratio of the combustion mixture (which generates the exhaust gases) so that the objective of the exhaust gas catalyst is caused to be more difficult to achieve. This problem is due in part to nonuniform distribution of the liquid fuel within the intake manifold of the engine. Even in those fuel systems which deliver liquid fuel to the intake ports of the engine, manifold "wetting" can cause the air/fuel ratio to vary from cylinder to cylinder resulting in nonoptimum exhaust gas chemistry. Additionally, with a liquid fuel, ignition and flame front propagation problems leading to increased generation of pollutants are encountered. It has been suggested that this difficulty may be overcome by the use of vaporized liquid fuel.

The typical liquid fuel used in internal combustion engines is gasoline. Gasoline may be expected to be completely vaporized at temperatures of about 425° F. As is known, commercially available gasoline is comprised of a substantial number of petroleum product fractions, each of which has a separate vaporization temperature. With commercially available gasoline however, the vaporization temperatures do not exceed about 425° F. In order to achieve the benefits of a vaporized liquid fuel system, it is necessary to maintain the liquid fuel in a vaporized state until the fuel is delivered to the internal combustion engine combustion chambers.

According to prior art techniques for delivering vaporized liquid fuel to an air stream for mixture therewith and delivery to the combustion chambers of an internal combustion engine, the vaporized liquid fuel may be indiscriminatly allowed to contact relatively cool engine components. This contact can be expected to cause substantial amounts of vaporized liquid fuel condensation. To the extent that the vaporized liquid fuel may be allowed to condense within the fuel and air delivery system, the ability to accurately control the air/fuel ratio of the combustion mixture at a desired ratio is lost. It is therefore a specific object of the present invention to provide apparatus for promoting the mixing of vaporized liquid fuel with air while preventing direct contact between the vaporized liquid fuel and any relatively cool engine parts. More specifically, it is an object of the present invention to provide apparatus for causing the injected air stream to constrain the vaporized liquid fuel stream to remain within the approximate center region of the air stream thereby substantially reducing the opportunity for fuel condensation.

Since it is known that the dew point for a mixture of vaporized fuel mixed with air is substantially lower than the dew point of the raw or unmixed vaporized liquid fuel, it is a further and specific object of the present invention to provide a means for rapidly intermixing a vaporized liquid fuel with air. It is a further and specific object to provide such a means which avoids direct contact with the vaporized liquid fuel. It is a further and specific object of the present invention to provide such a means which not only avoids direct contact with the vaporized liquid fuel but which inhibits the vaporized liquid fuel from directly contacting any relatively cool engine components. It is also an object of the present invention to provide such a system which is relatively simple and inexpensive.

SUMMARY OF THE PRESENT INVENTION

The present invention provides a finned swirl inducing member situated immediately downstream from the vapor delivery nozzle and the metering venturi. The finned member is provided with a centrally positioned aperture which is in approximate alignment with the vapor delivery nozzle and is sized to avoid contact between the swirl member and the vaporized liquid fuel stream. The finned swirl inducing member is arranged to impart swirl to the intake air stream downstream from the swirler which swirl will constrain the vaporized liquid fuel to the approximate center of the swirl. A mixing chamber is located immediately downstream from the swirl inducing member and communicates the swirl inducing member and the gases passing through the swirler with a conventional internal combustion engine throttle body and intake manifold. The mixing chamber provides a relatively short flow zone for the total air/fuel mixture to allow mixing of the vaporized liquid fuel with the air stream prior to communication with the engine throttle valve and the individual intake manifold runners for communication with each of the combustion chambers of the engine.

BRIEF DESCRIPTION OF THE DRAWINGS

FIG. 1 illustrates a vaporized liquid fuel delivery and metering system with which the present invention is of utility.

FIG. 2 illustrates the present invention in association with a vapor delivery nozzle arranged within an otherwise conventional metering venturi.

FIG. 3 illustrates the swirl inducing member of the present invention in a perspective view.

DETAILED DESCRIPTION OF THE PREFERRED EMBODIMENT

Referring now to the drawing wherein like numerals designate like structure throughout the various views thereof, FIG. 1 illustrates a vaporized liquid fuel delivery and metering system 10 with which the present invention is of utility. The vaporized liquid fuel delivery and metering system 10 is arranged to provide a combustible mixture to the intake manifold 12 of an internal combustion engine 14. Internal combustion engine 14 is provided with combustion by-product exhaust gas conduit means 16. Intake manifold 12 is provided with throttle body 17. As illustrated, internal combustion engine 14, intake manifold 12, throttle body 17 and exhaust gas conduit means 16 are substantially conventional. For purposes of illustration, it will be considered that internal combustion engine 14 is of the type adapted for installation and use in powering an automotive vehicle, now shown.

System 10 is arranged to receive liquid fuel from a conventional liquid fuel reservoir or tank, not shown, through conduit 18. Conduit 18 communicates with intermediate liquid fuel reservoir 20. The communication between conduit 18 and intermediate reservoir 20 may be controlled, for example, by a pivoted float valve 22 in the conventional manner. As will be appreciated, liquid fuel could be pumped through conduit 18 by conventional pumping means such as the conventional mechanical or electrical fuel pump normally used in automotive vehicles.

Liquid fuel contained in intermediate reservoir 20 may be provided by coarse liquid fuel delivery means 24 to primary heating means 26. Coarse liquid fuel delivery means 24 may include for example, an electrical or mechanical liquid pump 28 and a liquid control valve 30. An auxiliary heating means 32 is arranged in fluid serial flow relationship with respect to the primary heating means 26 so that fuel provided from intermediate reservoir 20 would flow serially through the primary heating means 26 and thence through auxiliary heating means 32. The heating means are shown to be communicated via conduits 34 to a vapor storage reservoir 36.

As illustrated in FIG. 1, the primary and auxiliary heating means 26, 32 are connected in serial fluid flow relationship. In order for efficient operation of the auziliary heating means 32, it should be designed for relatively low fuel flow consonant with operation of the associated engine at idle. As such, however, the auxiliary heating means 32 could present a high impedance to fluid flow and could impede engine operation under high fuel consumption conditions. It is therefore contemplated that the primary and auxiliary heating means could be connected in parallel fluid flow. It is also contemplated to provide a fluid by-pass valve downstream from primary heating means 26 and upstream from the auxiliary heating means 32 to place the primary heating means 26 in direct fluid communication with the vapor reservoir 36 when the auxiliary heating means 32 are not required as a vapor supply source.

Vapor reservoir 36 is communicated by way of conduit 38 with carburetor means 40 according to the present invention. As used herein "carburetor" means the apparatus according to the present invention for mixing fuel with air to establish a combustible air/fuel mixture. As illustrated in FIG. 1, the vapor delivery nozzle 42 of vapor delivery conduit 38 is positioned within the low pressure zone formed by the metering venturi means 44 of the carburetor means 40. A movable pintle 46 is situated witin the vapor delivery nozzle 42 and is controlled by servomechanism means 48. Carburetor means 40 includes mixing section 47 which intercommunicates the metering venturi means 44 with the throttle body 17 upstream from the intake manifold 12. The operation and structure of carburetor means 40 and fuel delivery nozzle means 42 is described hereinbelow with reference to FIGS. 2 ad 3.

Servomechanism 48 may be, for example, a conventional servomotor operated electrically or by electromechanical means. Servomechanism 48 receives an input command signal from servomechanism control means 50. As here illustrated, servomechanism control means 50 are arranged to be responsive to an exhaust gas sensor 52 which may be for example, a titania exhaust gas sensor according to U.S. Pat. No. 3,886,785. According to FIG. 1, fuel delivery and metering system 10 is also provided with vapor temperature control means 54. Temperature control means 54 are arranged to be responsive to the vapor temperature in vapor delivery conduit 38 in order to control an exhaust gas flow diverter valve 56. Valve 56 is operative to control the heating of primary heating means 26.

Referring now to FIG. 2, the carburetor means 40 according to the present invention is shown. Carburetor means 40 is provided with means defining a substantially conventional metering venturi 44. Vapor conduit 38 is provided with vapor delivery nozzle 42 which is situated within the metering venturi 44 of the carburetor means 40. Vapor conduit 38 is arranged to place the orifice of vapor delivery nozzle 42 within the low pressure region established by the metering venturi 44. In the preferred embodiment, metering venturi 44 is arranged to define an air flow passage which is rapidly convergent on its upstream side and gradually divergent on its downstream side. The terms "upstream" and "downstream" relate to the direction of intake air flow which is illustrated by arrow A. Swirl inducing means 214 is situated downstream from metering venturi 44 upstream from mixing section 47. Swirl inducing means 214 is described more fully hereinbelow with reference to FIG. 3. A mixing region 215 is disposed downstream from swirl inducing means 214 within mixing section 47.

As a coarse measure of air/fuel ratio control, the ratio of the area of the metering venturi 44 in the plane of the orifice of vapor delivery nozzle 42 when compared to the area of the orifice of the vapor delivery nozzle 42 should be slightly less than that which would produce the desired air/fuel ratio. We have determined that the air/fuel ratio is approximately equal to seven tenths (0.7) of the ratio of the air delivery area compared to fuel delivery area. This relationship is an approximation and is based on air at 70° F. and commercially available gasoline, as the fuel, vaporized at 400° F. By modulating the actual area of fuel delivery through use of a movable pintle and needle valve, for example, the actual air/fuel ratio may be modulated and a desired air/fuel ratio may be precisely attained. In view of the fact that fuel vapor is provided to the moving air stream with substantially the same pressure differential through the orifice of vapor delivery nozzle 42 as is experienced by the air stream in flowing from the upstream side of metering venturi 44 to the plane of the orifice of nozzle 42 and is delivered to the low pressure region defined by the air stream moving through metering venturi 44, the mass of vaporized liquid fuel can be precisely controlled to match the mass of air being consumed by the associated engine to maintain a preselected and desired air/fuel ratio for all mass ratios of air flow.

Referring now to FIGS. 2 and 3, the swirl inducing means 214 are illustrated in a perspective view. Air swirl inducing means 214 are comprised of a substantially annular insert member having a solid rim portion 216 and a plurality of upstanding fin members 218. Fin members 218 are connected at their radially inwardmost point by a further substantially annular rim 220 which is arranged to define an annular aperture 222 at the central portion of swirl inducing means 214. Aperture 222 is sized and positioned with respect to vapor delivery nozzle 42 to permit the unhindered passage of a vapor stream from vapor delivery nozzle 42 through the air swirl inducing means 214 without contact of the vapor stream with swirl inducing means 214. Fin members 218 are cooperative to induce a swirling movement of the air stream as it passes over the fin members 218 into mixing region 215 of the mixing section 47. This swirl is operative to promote intermixing of the vapor stream from vapor delivery nozzle 42 with the air passing through the mixing region 215. Further, and more importantly, the swirl is operative to prevent the vapor stream from coming into contact with the side walls of the mixing section 47 to thereby further reduce any opportunity for contact of the vaporized liquid fuel with a relatively cooler surface and resultant condensation.

With reference to FIGS. 1 and 2, mixing section 47 is shown to be vertically disposed between carburetor means 40 and throttle body 17 and is operative to provide an unobstructed mixture flow conduit therebetween. It will be appreciated that the vertical orientation of mixing section 47 is arbitrary and for purposes of illustration. Mixing section 47, in an automotive installation could also be disposed horizontally across the top of engine 14.

The "raw" vaporized fuel will have a dew point dependent upon the various fractions which make up the vapor. However, the fuel vapor per se can begin to condense as its temperature drops below the termpature of complete vaporization, for example 425° F. The dew point of an air/fuel mixture having a vaporized liquid fuel such as gasoline is approximately 125° F. (at atmospheric pressure), again depending upon the fuel fractions present in the fuel vapor. As the pressure drops to subatmospheric levels, the dew point of the fuel vapor within the air/fuel mixture will be further lowered. Thus, once the fuel vapor has been mixed with air, the dew point of the fuel vapor will drop dramatically. The condensation problem is therefore substantially lessened and contact with engine components will not have an adverse effect on the vapor form of the fuel. Additionally, the high vapor inlet temperatures and the short residence time of the vapor in the region downstream from air swirl inducing means 214 will virtually preclude any opportunity for condensation to occur.

The precise area of the orifice of fuel delivery nozzle 42 may be varied by the movement of pintle 46 in order to vary the area of the fuel delivery nozzle and hence the quantity of vaporized liquid fuel being provided to the engine through vapor delivery conduit 38. A throttle valve situated within throttle body 17 may be operative to vary the rate of delivery of the combustible air/fuel mixture to the intake manifold of engine 14 from the carburetor means 40. The throttle valve may be operated in the conventional manner. As discussed hereinabove, the throttle valve will not cause or promote any substantial amounts of vaporized fuel condensation since it will be positioned below the mixing section 47 and hence sufficiently downstream from vapor delivery nozzle 42 to be in the mixture where the dew point of the vaporized fuel has been lowered. Additionally, the throttle valve will normally be at a relatively elevated temperature due to its proximity to the heated components of the engine 14. Preferably, the orifice of vapor delivery nozzle 42 will be placed within the region defined by metering venturi 44 at or within the zone of maximum depression (minimum pressure) in order to provide the greatest pressure differential across the orifice. However, accurate placement within the low pressure zone is not critical since the vapor pressure is referenced to substantially the same pressure as exists upstream from the metering venturi 44 and the size of the minimum pressure zone defined in the direction of flow (arrow A) is variable.

I claim:
1. A carburetor for mixing a vaporized liquid fuel with air to establish a combustible air/fuel mixture for delivery to an engine comprising in combination:
a carburetor body;
metering venturi means within said body communicating on an upstream end with a source of air and adapted to generate, in use, a low pressure zone having a pressure indicative of the rate of air flow therethrough;

vapor delivery nozzle means situated within the low pressure zone defined by said venturi means and having a vapor delivery orifice operative to deliver a stream of vaporized liquid fuel to the low pressure zone in response to air flow therethrough;

air swirl inducing means situated dowstream from said venturi means arranged to intercept air flowing through said venturi means and operative to cause air flowing through said venturi means to acquire a component of motion at an angle to the direction of flow whereby air flowing therethrough may become a swirling air mass;

said air swirl inducing means including means defining an aperture in alignment with the vapor delivery nozzle operative to permit a stream of vaporzied liquid fuel issuing from said delivery nozzle to pass therethrough without substantial contact with the air swirl inducing means; and mixing section means downstream from said swirl inducing means for fluid communication with the engine;

said mixing section means having surface wall portions operative to define a mixing space whereby the swirling air mass and the vaporized liquid fuel may be mixed to establish a combustible air/fuel mixture prior to introduction into the engine;

said swirling mass being operative to prevent contact between the vaporized liquid fuel and the surface wall portions of the mixing section means.

2. The carburetor according to claim 1 wherein said air swirl inducing means comprise a plurality of fin members arranged about the aperture defining means and extending from the side wall portions of said carburetor body.

3. The carburetor according to claim 2 wherein said means defining an aperture comprise:

a generally annular rim having an aperture extending therethrough in a vapor flow direction;

said plurality of fin members being attached to said apertured rim; and an outer rim portion adapted for attachment to said carburetor body.

4. In a carburetor for establishing an air/fuel mixture for delivery to the intake manifold of an internal combustion engine having a throttle body for controlling the rate of delivery of the combustible mixture to the engine, the carburetor including a metering venturi means operative to generate a low pressure zone upon passage of air therethrough, the zone having a pressure indicative of the rate of air passage therethrough, the improvement comprising in combination:

vapor delivery nozzle means for fluid communication with a source of vaporized liquid fuel;

said nozzle means having a vapor delivery orifice situated within the low pressure zone and arranged to provide a stream of vaporized fuel into, and in the direction of air flow through, the low pressure zone; and swirler means situated downstream from the metering venturi means operative to induce swirling of any air mass flowing through the metering venturi means;

said swirler means including means defining an unobstructed vapor aperture in alignment with said vapor delivery nozzle means operative to permit a stream of vaporized liquid fuel to pass therethrough while avoiding any substantial contact between the vapor stream and said swirler means.

5. The carburetor according to claim 4 including further:

mixing section means having side wall portions downstream from said swirler means operative to define an unobstructed mixing zone and further operative to communicate any air flowing through said metering venturi with the throttle body;

said swirler means cooperative with said mixing section means to promote mixing of the vaporized liquid fuel with the swirling air mass while the swirling air mass constrains the vaporized liquid fuel stream to prevent contact of the vaporized liquid fuel stream with the side wall portions of the mixing section means.

* * * * *